Patented July 26, 1949

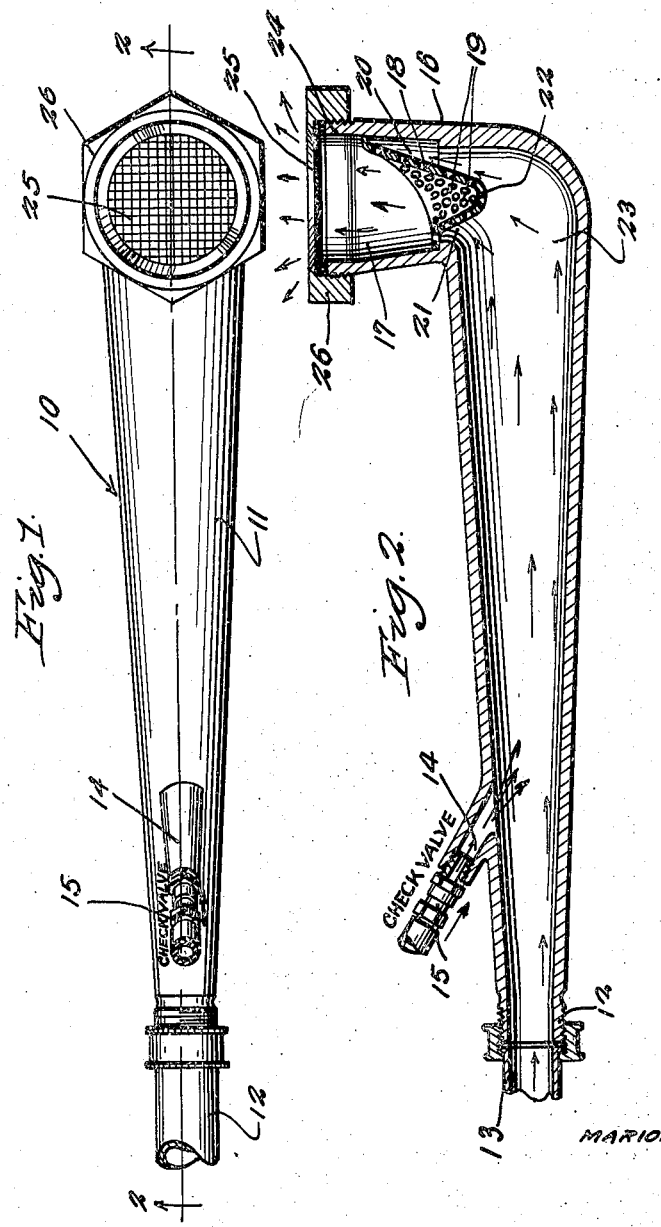

2,477,204

UNITED STATES PATENT OFFICE 2,477,204

SOIL AERATOR

Marion D. Ravine, New Philadelphia, Ohio

Application November 26, 1945, Serial No. 630,813

2 Claims. (Cl. 261—76)

The invention as described herein, and illustrated in the accompanying drawings, consists of a watering nozzle, an object of which is to discharge water mixed with air from the nozzle.

Another object of the invention is to provide means whereby aerated water will be discharged onto the soil and surrounding growing plants.

A further object of this invention is to provide a watering nozzle with an air and water mixing chamber.

Another object of the invention is to provide in a watering nozzle means for drawing air thereinto and means for breaking up the mixture to force it to gush from the nozzle in bubbles.

Other features and advantages will become more readily apparent from the following description and the accompanying illustrative drawings in which:

Figure 1 is a plan view of the nozzle, and

Figure 2 is a longitudinal sectional view thereof.

In order to accomplish the objects above set forth the nozzle 10, has been designed. The nozzle is provided with a tapering tubular stem 11, to the end 12, of which is connected a water hose 13, slightly below which is provided an air inlet 14, controlled by a check valve 15. The end 16, of the member 11, is turned at right angles to form an outlet port 17, within which is seated a basket 18, perforated throughout as at 19, with a series of irregularly roughly cut apertures to which there is entrance space on all sides as at 20, within the parts 17, and 21, below said port, the bottom 22, of the basket depending into the enlarged passageway 23, of the stem 11. Seated upon the outer edge 24, of the right angular portion 16, is a wire fabric screen 25, held thereon by a flange nut 26.

From the foregoing it will be seen that water under pressure will be forced into the said passageway 23, and will draw in a volume of air through the port 14 by the aspirator principle when water is passing by said port, which water and air will be mixed within said passage and be broken up thoroughly in passing through the apertures of the basket 18, and further mixed into air-laden spray and bubbles upon passing through the screen 25, which mixture will be driven into the earth toward which the outlet of the device is directed.

Having now described the invention that which is claimed to be new and desired to be procured by Letters Patent is:

1. A watering nozzle including an elongated tubular member having a reduced inlet end, said member being tapered outwardly from the reduced end and having an enlarged discharge end, said enlarged end being bent laterally defining an elbow, said elbow terminating in an outwardly tapering open end, a strainer detachably clamped on the open end of said elbow, a shoulder formed at the angular bend of the elbow, a perforated conical strainer, a flange projecting from the periphery of the open major end of the conical strainer seated on said shoulder and engaging the inner wall of the tapered end of the elbow spaced from said shoulder, an air inlet integrally formed with said member and angularly extending from the member at a spaced distance from said inlet end, and a check valve associated with said inlet whereby fluid is prevented from passing through the air inlet.

2. A watering nozzle including an elongated longitudinally tapered tubular member, having a reduced inlet end and an enlarged discharge end, said discharge end being angularly bent defining an elbow, said elbow terminating in an open end, a foraminous member detachably secured on said open end of the elbow, a shoulder formed at the angular bend of the elbow defining a restriction at said point, a perforated conical strainer having a closed minor end and an open major end, a peripheral non-planar flange on said major end, said flange being seated on the shoulder and engaging the inner wall of the elbow spaced from the shoulder, said minor end extending into the discharge end of the member and disposed in longitudinal alignment with the inlet end, an air inlet angularly formed with said member and spaced from the inlet end, and a check valve associated with said inlet whereby fluid is prevented from entering the air inlet.

MARION D. RAVINE.

REFERENCES CITED

The following references are of record in the file of this patent:

UNITED STATES PATENTS

| Number | Name | Date |
| --- | --- | --- |
| 1,334,911 | Lampkin | Mar. 23, 1920 |
| 1,650,081 | Lindsay | Nov. 22, 1927 |
| 2,120,620 | Mowery | June 14, 1938 |
| 2,247,311 | Rockwood | June 24, 1941 |

FOREIGN PATENTS

| Number | Country | Date |
| --- | --- | --- |
| 125,809 | Great Britain | June 6, 1918 |
| 428,103 | Great Britain | May 7, 1935 |
| 468,687 | Great Britain | July 6, 1937 |